(12) United States Patent
Ma

(10) Patent No.: US 12,320,407 B2
(45) Date of Patent: Jun. 3, 2025

(54) CARABINER CAPABLE OF ADJUSTING LENGTH OF HARNESS

(71) Applicant: Rongtian Ma, Shenzhen (CN)

(72) Inventor: Rongtian Ma, Shenzhen (CN)

( * ) Notice: Subject to any disclaimer, the term of this patent is extended or adjusted under 35 U.S.C. 154(b) by 0 days.

(21) Appl. No.: 18/914,000

(22) Filed: Oct. 11, 2024

(65) Prior Publication Data

US 2025/0035190 A1 Jan. 30, 2025

(30) Foreign Application Priority Data

Sep. 29, 2024 (CN) .............................. 202422395930

(51) Int. Cl.
*F16G 11/12* (2006.01)
*F16B 45/02* (2006.01)

(52) U.S. Cl.
CPC ............ *F16G 11/12* (2013.01); *F16B 45/023* (2021.05)

(58) Field of Classification Search
CPC ...... F16G 11/12; F16B 45/023; F16B 21/165; A01K 27/004; A01K 27/005; A45F 5/004; B65H 75/28; B65H 75/285; Y10T 403/592; F16L 37/23
See application file for complete search history.

(56) References Cited

U.S. PATENT DOCUMENTS

| | | | | |
|---|---|---|---|---|
| 2,898,797 | A * | 8/1959 | Bronstein | F16B 21/165 74/543 |
| 3,171,183 | A * | 3/1965 | Johnston | A44C 5/2028 24/635 |
| 6,390,722 | B1 * | 5/2002 | Godfrey | F16B 21/165 403/321 |
| 7,748,091 | B2 * | 7/2010 | Bogh-Sorensen | F16B 21/165 403/322.2 |
| 8,702,025 | B2 * | 4/2014 | Kish | A01K 27/004 242/378.1 |
| 9,009,929 | B2 * | 4/2015 | Genova | A01K 27/005 119/776 |
| 9,560,836 | B2 * | 2/2017 | DeBien | A01K 27/004 |
| 10,729,106 | B2 * | 8/2020 | McConnell | A01K 27/005 |
| 10,834,904 | B2 * | 11/2020 | Pagan | B65H 75/446 |
| 11,026,502 | B1 * | 6/2021 | Erold | A45F 5/004 |
| 11,131,335 | B1 * | 9/2021 | Nicalek | H05B 45/37 |
| 11,596,140 | B2 * | 3/2023 | Doberenz | A01M 21/02 |
| 2012/0051835 | A1 * | 3/2012 | Taylor | F16B 21/165 403/322.2 |

(Continued)

*Primary Examiner* — Jason W San
*Assistant Examiner* — Louis A Mercado
(74) *Attorney, Agent, or Firm* — Hemisphere Law, PLLC; Zhigang Ma

(57) ABSTRACT

The present disclosure relates to field of outdoor sports, and discloses a carabiner capable of adjusting a length of a harness, including a main body. A limit pillar is fixedly arranged at one side of the main body. In the present disclosure, to mount the carabiner capable of adjusting the length of the harness, a clockwork spring is first placed in a groove of the main body, and a hole of a fixed gear is aligned with the limit pillar; then, a moving gear is placed in a clamping pillar of an upper cover; and finally, a lower cover is aligned with the clamping pillar to complete mounting. Through the meshing between the fixed gear and the moving gear, the harness body can be fixed at a specific length, thereby ensuring the safety in high-risk activities such as rock climbing and hiking.

5 Claims, 7 Drawing Sheets

(56) References Cited

U.S. PATENT DOCUMENTS

| | | |
|---|---|---|
| 2016/0281766 A1 | 9/2016 | Moine et al. |
| 2017/0198739 A1* | 7/2017 | Bensoussan .......... F16B 21/165 |
| 2018/0343834 A1* | 12/2018 | McConnell ............. A01K 1/04 |
| 2019/0154076 A1 | 5/2019 | Schmitz |
| 2021/0131481 A1 | 5/2021 | Walker |
| 2022/0361454 A1* | 11/2022 | Phillips ................ F16B 45/023 |

* cited by examiner

CARABINER CAPABLE OF ADJUSTING LENGTH OF HARNESS

TECHNICAL FIELD

The present disclosure relates to the field of outdoor sports, and in particular, to a carabiner capable of adjusting a length of a harness.

BACKGROUND

A carabiner is a metal ring specifically designed to connect and fix harness bodies, equipment, or other objects, and is widely applied to various outdoor sports. The carabiner is usually made of aluminum alloy or steel. These materials endow the carabiner with characteristics of portability and firmness, so that the carabiner can withstand significant tension and wear in extreme environments. The carabiner is usually designed to include an opening and a locking mechanism. The opening allows a user to connect a rope or equipment to a buckle ring conveniently, while the locking mechanism prevents accidental opening during use. In various outdoor sports such as skiing and ice climbing, the carabiner is configured to connect equipment and increase safety.

The carabiners widely used on the market are usually provided with harness bodies to increase application flexibility of the carabiners in various outdoor activities. However, the harness bodies of these carabiners are usually movable. Users cannot ensure that ropes are maintained at required lengths all the time during use. This instability may lead to that changes in rope lengths affect safety and increase the risk of accidents in high-risk activities such as rock climbing and skiing.

Therefore, those skilled in the art provide a carabiner capable of adjusting a length of a harness to solve problems proposed in the foregoing background.

SUMMARY

An objective of the present disclosure is to propose a carabiner capable of adjusting a length of a harness to overcome disadvantages in the related art. The present disclosure allows a user to freely adjust a length of a harness body as required.

To achieve the above objective, the present disclosure provides the following technical solution:

A carabiner capable of adjusting a length of a harness includes a main body. A limit pillar is fixedly arranged at one side of the main body. A chute is formed in a position in one side of the main body close to the limit pillar. A lock catch is fixedly arranged at an upper end of the main body. A pulling rope adjustment mechanism is fixedly arranged at an outer end of the main body. A threaded hole is formed in a lower end of the main body. A locking mechanism is arranged in the threaded hole through threads.

Further, the pulling rope adjustment mechanism includes an upper cover, a lower cover, a clockwork spring, and a fixed gear. A clamping pillar is fixedly arranged at one end of the upper cover. A moving gear is fixedly arranged an outer end of the clamping pillar in a sleeving manner. A sliding block is fixedly arranged at one side of the fixed gear. A harness body is spirally arranged at an outer end of the clockwork spring.

Further, the upper cover is fixedly arranged at one side of the main body, and the lower cover is fixedly arranged at one side of the main body away from the upper cover.

Further, the sliding block is arranged at an inner end of the chute in a sliding manner. The limit pillar is fixedly connected to the fixed gear.

Further, the clamping pillar is rotatably arranged in a hole of the lower cover. The moving gear meshes with the fixed gear.

Further, the locking mechanism includes a buckle and a lock. A spring shaft is fixedly arranged at an outer end of the buckle in a sleeving manner.

Further, the lock is arranged at an inner end of the threaded hole through a thread. The buckle is movably arranged at an outer end of the lock. The buckle is fixedly connected to the harness body.

The present disclosure has the following beneficial effects:
 1. When the carabiner capable of adjusting the length of the harness provided in the present disclosure is mounted, the clockwork spring is first placed in a groove of the main body and a hole of the fixed gear is aligned with the limit pillar; then the moving gear is placed in the clamping pillar of the upper cover; finally, the lower cover is aligned with the clamping pillar; and a bolt is screwed into holes of the upper cover and the lower cover to complete the mounting. A user can complete the mounting quickly and easily, so that the operational complexity is reduced, and the work efficiency is improved. The mounting time is shortened, and the mounting complexity is reduced, so that the user can achieve a better experience during use.
 2. According to the carabiner capable of adjusting the length of the harness provided in the present disclosure, when the harness body is pulled, due to the meshing between the fixed gear and the moving gear, a pulling length can be controlled every time the moving gear meshes the fixed gear. Through the meshing between the fixed gear and the moving gear, the harness body can be effectively locked by the carabiner. Through the locking mechanism, the harness body can be fixed at a specific length and prevented from being loosened accidentally, thereby ensuring the safety in high-risk activities such as rock climbing and hiking.

1, main body; 2; limit pillar; 3, chute; 4, lock catch; 5, pulling rope adjustment mechanism; 6, locking mechanism; 7, harness body; 8, threaded hole; 501, upper cover, 502, clamping pillar; 503, lower cover; 504, clockwork spring; 505, fixed gear; 506, sliding block; 507, moving gear; 601, buckle; 602, spring shaft; and 603, lock.

DETAILED DESCRIPTION OF THE EMBODIMENTS

Technical solutions in the embodiments of the present disclosure will be clearly and completely described below with reference to accompanying drawings in the embodiments of the present disclosure. Apparently, the described embodiments are merely part rather than all embodiments of the present disclosure. Based on the embodiments in the present disclosure, all other embodiments obtained by those of ordinary skill in the art without creative work fall within the scope of protection of the present disclosure.

Figure 1:
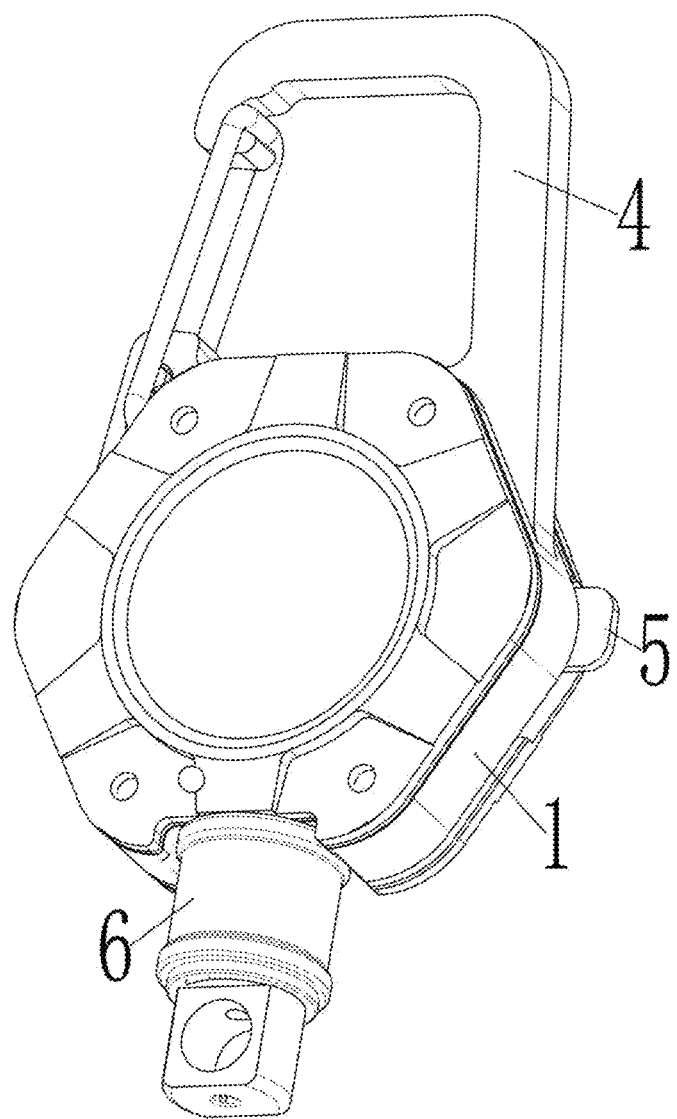
FIG. 1 is a schematic axonometric drawing of the present disclosure.
Figure 2:
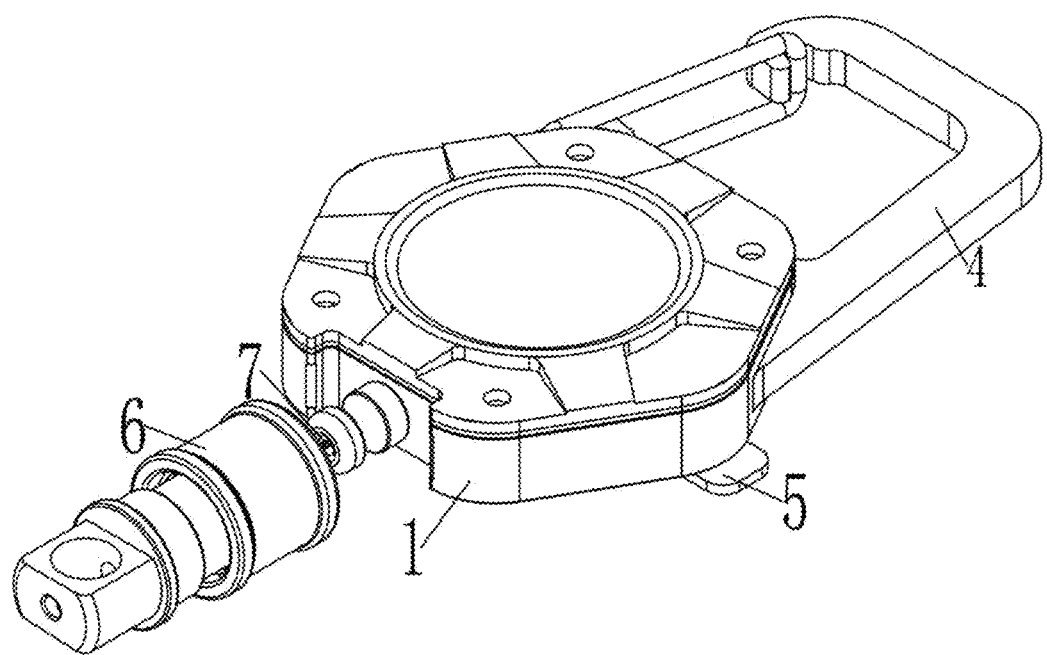
FIG. 2 is a schematic axonometric drawing of the present disclosure after a rope body is pulled.
Figure 3:
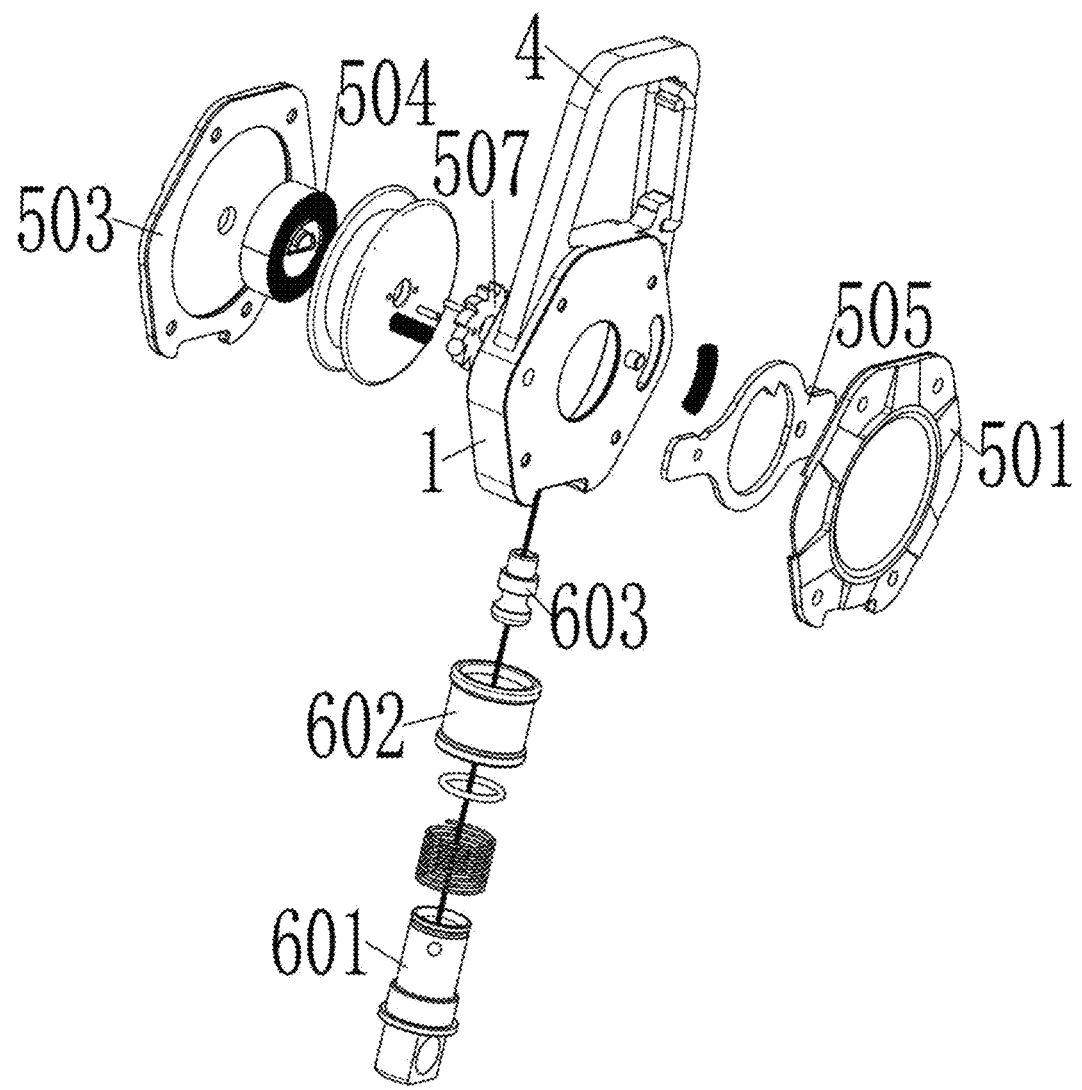
FIG. 3 is a front schematic axonometric drawing of the present disclosure after being disassembled.
Figure 4:
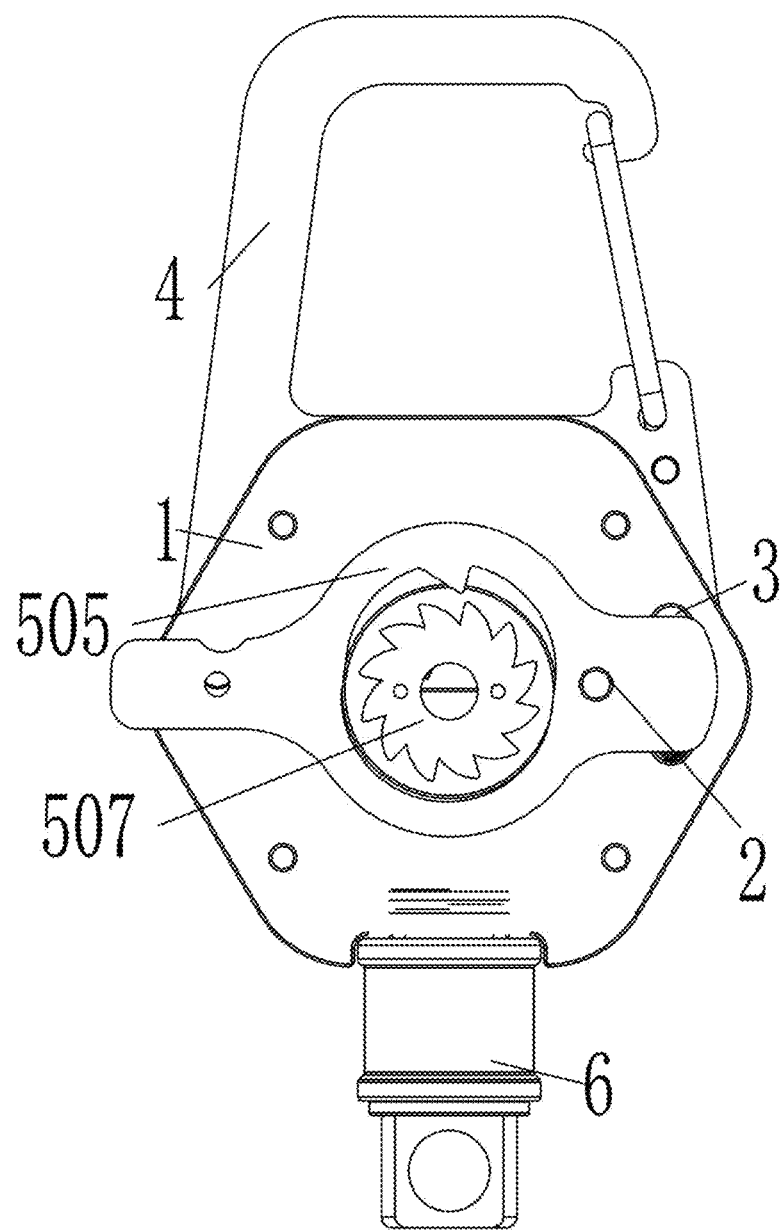
FIG. 4 is a schematic main view of a moving gear of the present disclosure.

Referring to FIG. 1 and FIG. 2, an embodiment according to the present disclosure is as follows:

A carabiner capable of adjusting a length of a harness includes a main body 1. A limit pillar 2 is fixedly arranged at one side of the main body 1. A chute 3 is formed in a position in one side of the main body 1 close to the limit pillar 2. A lock catch 4 is fixedly arranged at an upper end of the main body 1. A pulling rope adjustment mechanism 5 is fixedly arranged at an outer end of the main body 1. A threaded hole 8 is formed in a lower end of the main body 1. A locking mechanism 6 is arranged in the threaded hole 8 through a thread.

Specifically, after the pulling rope adjustment mechanism 5 is mounted on the main body 1, a length of a harness body 7 can be manually controlled by pulling the locking mechanism 6. A user can adjust the harness body 7 by only simply pulling the locking mechanism 6, which is intuitive in operation, reduces the difficulty of use, and is suitable for being used by users of various skill levels.

Referring to FIG. 3, FIG. 4, FIG. 5, and FIG. 6, the pulling rope adjustment mechanism 5 includes an upper cover 501, a lower cover 503, a clockwork spring 504, and a fixed gear 505. A clamping pillar 502 is fixedly arranged at one end of the upper cover 501. A moving gear 507 is fixedly arranged an outer end of the clamping pillar 502 in a sleeving manner. A sliding block 506 is fixedly arranged at one side of the fixed gear 505. The harness body 7 is spirally arranged at an outer end of the clockwork spring 504.

The upper cover 501 is fixedly arranged at one side of the main body 1. The lower cover 503 is fixedly arranged at one side of the main body 1 away from the upper cover 501.

The sliding block 506 is arranged at an inner end of the chute 3 in a sliding manner. The limit pillar 2 is fixedly connected to the fixed gear 505.

The clamping pillar 502 is rotatably arranged in a hole of the lower cover 503. The moving gear 507 meshes with the fixed gear 505.

Specifically, to mount the pulling rope adjustment mechanism 5, the clockwork spring 504 is first placed in a groove of the main body 1; then a hole of the fixed gear 505 is aligned with the limit pillar 2; the moving gear 507 is placed in the clamping pillar 502 of the upper cover 501; and finally, the lower cover 503 is aligned with the clamping pillar 502. After the upper cover 501 and the lower cover 503 are mounted, the moving gear 507 meshes the fixed gear 505 by pulling a switch at a side end of the fixed gear 505, which can ensure stable locking of the harness body 7 during use, so that the harness body 7 can be pulled by the locking mechanism 6. The present disclosure allows a user to freely adjust the length of the harness body 7 as required to adapt to different usage scenarios such as rock climbing and camping, and provides great flexibility. Meanwhile, this locking mechanism prevents the harness body 7 from being loosened accidentally in high-risk environments, and increases the sense of safety of the user in various extreme activities.

Figure 5:
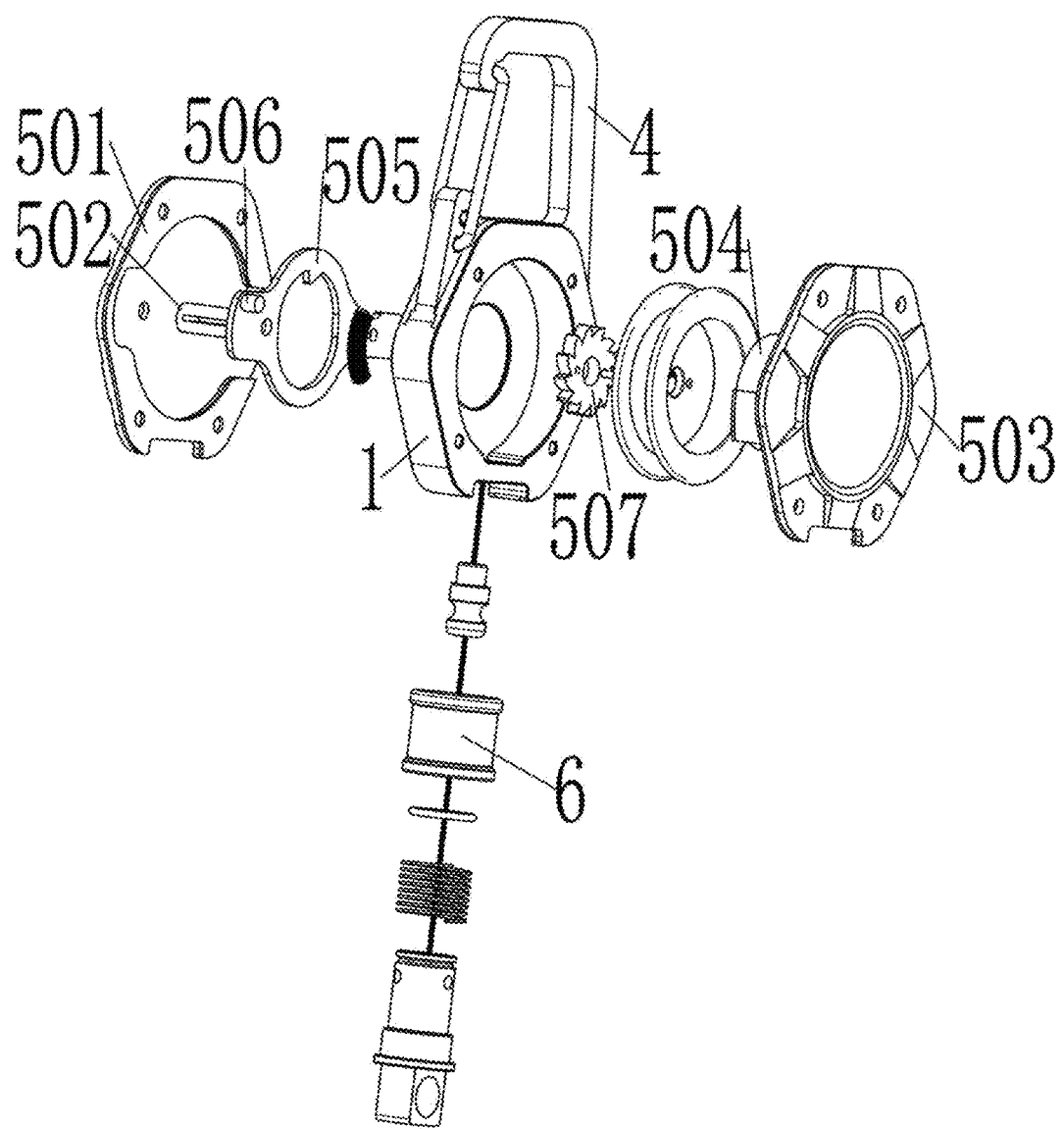
FIG. 5 is a rear schematic axonometric drawing of the present disclosure after being disassembled.
Figure 6:
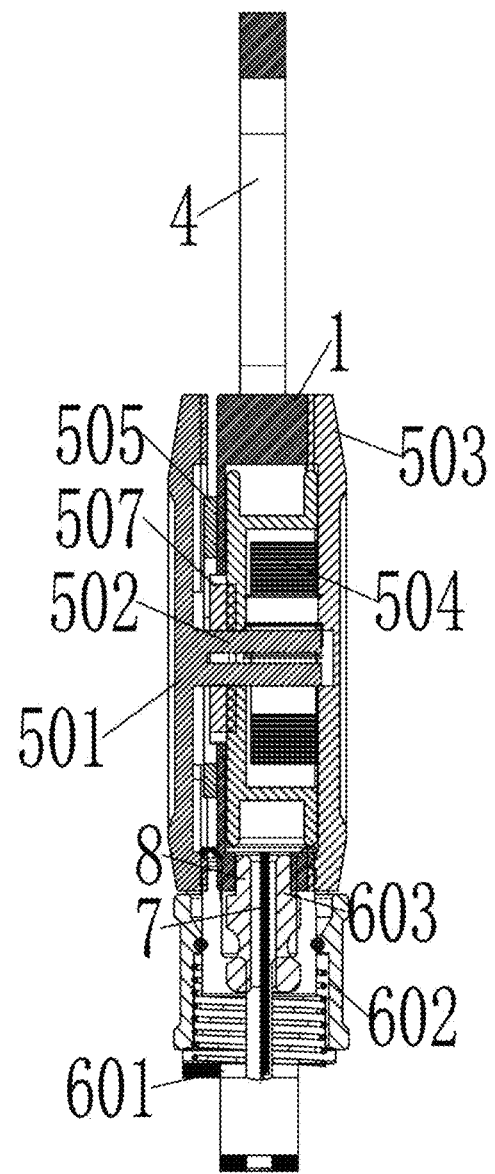
FIG. 6 is a schematic cross-sectional view of the present disclosure.
Figure 7:
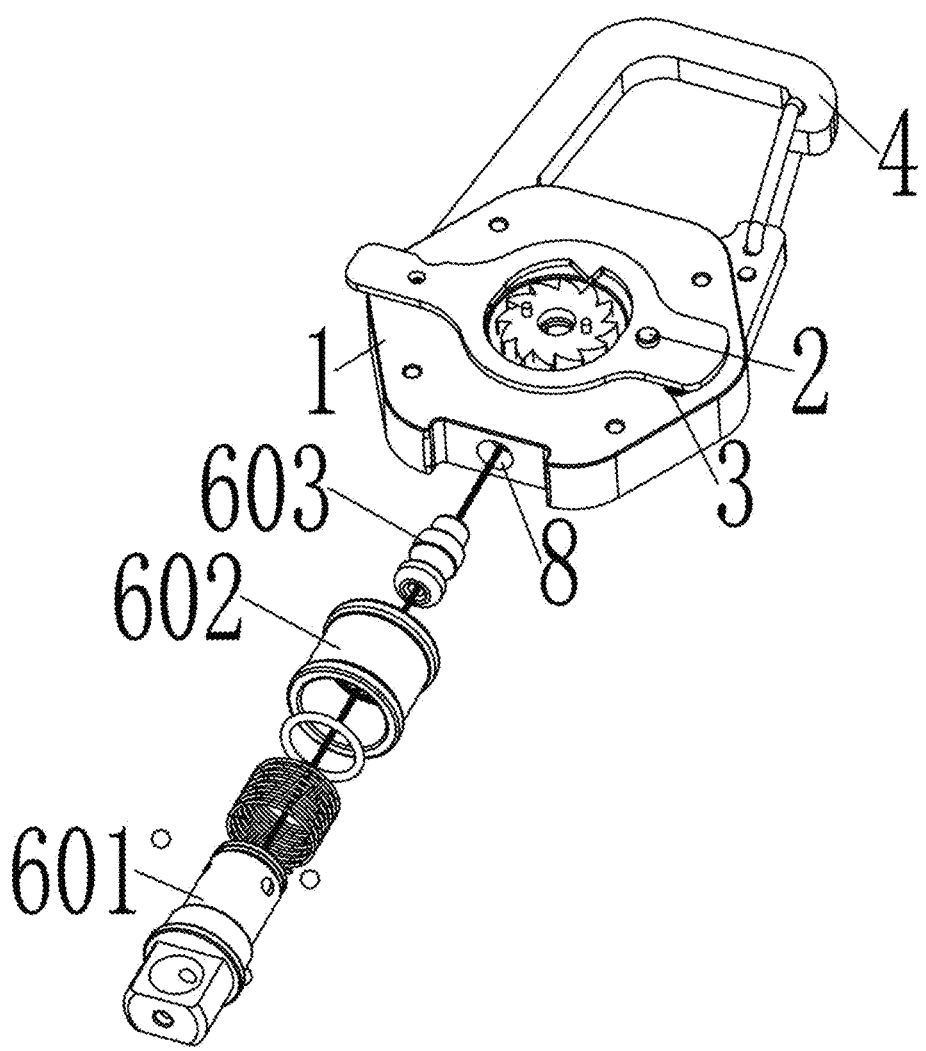
FIG. 7 is a schematic axonometric drawing of a main body of the present disclosure.

Referring to FIG. 5, FIG. 6, and FIG. 7, the locking mechanism 6 includes a buckle 601 and a lock 603. A spring shaft 602 is fixedly arranged at an outer end of the buckle 601 in a sleeving manner.

The lock 603 is arranged at an inner end of the threaded hole 8 through a thread. The buckle 601 is movably arranged at an outer end of the lock 603. The buckle 601 is fixedly connected to the harness body 7.

Specifically, the buckle 601 is fixedly connected to the harness body 7. After the buckle 601 is pulled, due to meshing between the moving gear 507 and the fixed gear 505, a pulling length can be accurately controlled every time the moving gear 507 meshes the fixed gear 505, so that a user can finely adjust the length according to specific requirements. Through the meshing between the fixed gear 505 and the moving gear 507, the carabiner can effectively lock the harness body 7, prevent the harness body 7 from being loosened accidentally, ensure the safety in high-risk environments, and reduce the probability of accidents. After the buckle 601 is pulled, due to a default fully wound state of the clockwork spring 504, an end of the clockwork spring 504 is connected to the harness body 7. At this moment, the clockwork spring 504 has a maximum torque lever and can output a large torque with a small force, thereby easily pulling the harness body 7. When energy of the clockwork spring 504 gradually depletes, the torque of the clockwork spring 504 decreases accordingly. At this moment, the end of the clockwork spring 504 has a minimum torque, which means that the harness body 7 can be continued to be pulled with higher force.

Working principle: To mount the pulling rope adjustment mechanism 5, the clockwork spring 504 is first placed in a groove of the main body 1; then a hole of the fixed gear 505 is aligned with the limit pillar 2; the moving gear 507 is placed in the clamping pillar 502 of the upper cover 501; and finally, the lower cover 503 is aligned with the clamping pillar 502. After the upper cover 501 and the lower cover 503 are mounted, the moving gear 507 meshes the fixed gear 505 by pulling a switch at a side end of the fixed gear 505, so that the harness body 7 can be pulled by the locking mechanism 6.

Secondarily, the buckle 601 is fixedly connected to the harness body 7. After the buckle 601 is pulled, due to the meshing between the moving gear 507 and the fixed gear 505, a pulling length can be controlled every time the moving gear 507 meshes the fixed gear 505, and a user can adjust the length of the harness body 7 as required at any time. After the buckle 601 is pulled, due to a default fully wound state of the clockwork spring 504, an end of the clockwork spring 504 is connected to the harness body 7. At this moment, the clockwork spring 504 has a maximum torque lever and can output a large torque with a small force, thereby easily pulling the harness body 7. When the energy of the clockwork spring 504 gradually depletes, the torque of the clockwork spring 504 decreases accordingly. At this moment, the end of the clockwork spring 504 has a minimum torque, which means that the harness body 7 can be continued to be pulled with higher force.

Finally, it is to be noted that: the above are merely preferred embodiments of the present disclosure and are not intended to limit the present disclosure. Although the present disclosure has been described in detail with reference to the embodiments mentioned above, those skilled in the art may still modify the technical solutions recorded in various embodiments mentioned above, or make equivalent replacement for part technical features therein. Any modification, equivalent replacement, improvement, and the like made within the spirit and principle of the present disclosure fall within the scope of protection of the present disclosure.

What is claimed is:

1. A carabiner capable of adjusting a length of a harness, comprising a main body (1), wherein a limit pillar (2) is fixedly arranged at one side of the main body (1); a chute (3) is formed in a position of one side of the main body (1) close to the limit pillar (2); a lock catch (4) is fixedly arranged at an upper end of the main body (1); a pulling rope adjustment mechanism (5) is fixedly arranged at an outer end of the main body (1); a threaded hole (8) is formed in a lower end of the main body (1); and a locking mechanism (6) is arranged in the threaded hole (8) through threads;

wherein the locking mechanism (6) comprises a lock (603) arranged in the threaded hole (8) through threads and a buckle (601) movably sleeving on the lock (603); the buckle (601) is fixedly connected to a harness body (7); and a spring sleeve (602) is fixedly arranged at an outer end of the buckle (601); the lock (603) is configured to be engaged with the buckle (601) in a locked position, and a spring is coaxially disposed between the buckle (601) and the spring sleeve (602), and in the locked position one end of the lock (603) opposite to the main body (1) abuts the spring.

2. The carabiner capable of adjusting the length of the harness according to claim 1, wherein the pulling rope adjustment mechanism (5) comprises an upper cover (501), a lower cover (503), a clockwork spring (504), and a fixed gear (505); a clamping pillar (502) is fixedly arranged at one end of the upper cover (501); a moving gear (507) is fixedly arranged an outer end of the clamping pillar (502) in a sleeving manner; a sliding block (506) is fixedly arranged at one side of the fixed gear (505); and the harness body (7) is spirally arranged at an outer end of the clockwork spring (504).

3. The carabiner capable of adjusting the length of the harness according to claim 2, wherein the upper cover (501) is fixedly arranged at one side of the main body (1); and the lower cover (503) is fixedly arranged at one side of the main body (1) away from the upper cover (501).

4. The carabiner capable of adjusting the length of the harness according to claim 2, wherein the sliding block (506) is arranged at an inner end of the chute (3) in a sliding manner; and the limit pillar (2) is fixedly connected to the fixed gear (505).

5. The carabiner capable of adjusting the length of the harness according to claim 2, wherein the clamping pillar (502) is rotatably arranged in a hole of the lower cover (503); and the moving gear (507) meshes with the fixed gear (505).

* * * * *